UNITED STATES PATENT OFFICE.

VACLAV KOLARIK, OF OWOSSO, MICHIGAN.

PROCESS OF MANUFACTURING BEET-SUGAR.

1,047,082. Specification of Letters Patent. Patented Dec. 10, 1912.

No Drawing. Application filed January 25, 1912. Serial No. 673,278.

*To all whom it may concern:*

Be it known that I, VACLAV KOLARIK, a citizen of the United States, and a resident of Owosso, in the county of Shiawassee and State of Michigan, have made certain new and useful Improvements in Processes of Manufacturing Beet-Sugar, of which the following is a specification.

My invention relates to processes of manufacturing beet sugar and it consists in the various steps hereinafter enumerated.

An object of my invention is first to produce from decayed beets a juice with the highest purity possible when the purity of the beets is below 80%.

A further object is to obtain a better lime cake than by the ordinary method.

Other objects and advantages will appear in the following specification, and the novel features of the process will be particularly pointed out in the appended claims.

In carrying out my invention I extract the sugar from the cossettes in the shortest possible time. In order to accomplish this I employ as few cells as possible, thus shortening the time of circulation. This should be done under a temperature of 35° C. to 45° C. Naturally this method will increase the sugar contents in the pulp, but to offset this loss of sugar in the pulp I procure a much purer juice, which is a necessary factor in producing good lime cake. I heat the raw juices of the beets which have been extracted in any suitable manner, to 65° C. or 75° C. From $2\frac{1}{2}$ to $5\frac{1}{2}$% of lime milk is then added, after which carbon dioxid is introduced until the best precipitation possible is obtained, *i. e.*, until the precipitate is of a grainy nature and the solution above it is clear. When this point is reached, the mixture is subjected to a heat of between 90° C. and 95° C. If during this heating a satisfactory precipitation is not obtained, more lime milk is introduced to the amount of 4% to 7%. This mixture is then subjected to a higher heat of approximately 100° C. or more. If this does not produce satisfactory precipitation *i. e.*, a grainy precipitation with a clear solution above it a new addition of approximately 10% of lime milk should be added. The addition of lime milk during the last higher heating may be continued until a good grainy precipitation is produced and the sugar solution above it appears clear to the eye. After this is accomplished the mixture is pumped by the filter press pump through the filters in the ordinary manner to obtain the lime cake.

I find that after the ordinary precipitation with carbon dioxid the addition of lime milk with a second heating at an increased temperature is especially effective on beets that have partly decayed and will result in a relatively good product which cannot be produced in the ordinary manner.

I claim:—

1. The herein described steps in the process of making beet sugar which consist in heating the raw juice, adding lime milk, treating the mixture with carbon dioxid until a maximum precipitation is produced, subjecting the mixture to an increased heat and adding more lime milk.

2. The herein described steps in the process of making beet sugar which consist in heating the raw juice to approximately 70° Cen., adding lime milk, treating the mixture with carbon dioxid until a maximum precipitation is produced, subjecting the mixture to a minimum temperature of 100° Cen. and adding more lime-milk until a good grainy precipitate is obtained.

3. The herein described steps in the process of making beet sugar which consist in heating the raw juice, adding lime milk, treating the mixture with carbon dioxid, subjecting the mixture to an increased heat Cen. and adding more lime milk until a good grainy precipitate is obtained.

VACLAV KOLARIK.

Witnesses:
A. CRANE,
ALBERT L. DENSMORE.

Copies of this patent may be obtained for five cents each, by addressing the "Commissioner of Patents, Washington, D. C."